United States Patent [19]
Byrne

[11] Patent Number: 4,749,334
[45] Date of Patent: Jun. 7, 1988

[54] CERAMIC ROTOR-SHAFT ATTACHMENT

[75] Inventor: Joe L. Byrne, Torrance, Calif.

[73] Assignee: Allied-Signal Aerospace Company, Los Angeles, Calif.

[21] Appl. No.: 678,742

[22] Filed: Dec. 6, 1984

[51] Int. Cl.[4] .......................... F01D 5/28; F16C 21/00
[52] U.S. Cl. ............................ 416/241 B; 416/244 A; 29/510; 403/285
[58] Field of Search ........... 416/241 B, 244 R, 244 A; 417/407; 29/525, 510, 517; 403/284, 274, 285, 361

[56] References Cited

U.S. PATENT DOCUMENTS

| | | | |
|---|---|---|---|
| 536,245 | 4/1894 | Wayre. | |
| 1,911,775 | 5/1933 | Smith et al. | 403/285 X |
| 2,297,508 | 9/1942 | Schutte | 416/241 B X |
| 2,433,589 | 12/1947 | Adams | 416/241 A |
| 3,055,100 | 9/1962 | Kimpel | 403/282 X |
| 3,801,226 | 4/1974 | Brevan et al. | 416/241 R |
| 3,865,497 | 2/1975 | Bratt et al. | 416/244 A |
| 3,905,723 | 9/1975 | Tori, Jr. | 416/241 R |
| 3,937,103 | 2/1976 | Kleinhans | 416/244 R |
| 3,999,376 | 12/1976 | Jeryan et al. | 415/219 R X |
| 4,063,850 | 12/1977 | Hueber | 415/214 |
| 4,125,344 | 11/1978 | Tiefenbacher | 416/183 |
| 4,152,816 | 5/1979 | Ewing et al. | 29/156.8 R |
| 4,176,519 | 12/1979 | Kronogard | 416/244 A X |
| 4,235,484 | 11/1980 | Owen et al. | 417/407 X |
| 4,279,576 | 7/1981 | Okano et al. | 417/407 |
| 4,293,619 | 10/1981 | Landingham et al. | 428/623 |
| 4,335,998 | 6/1982 | Siebels | 416/213 R |
| 4,370,106 | 1/1983 | Lauterbach | 417/407 |
| 4,424,003 | 1/1984 | Brobeck | 416/241 B |

FOREIGN PATENT DOCUMENTS

| | | |
|---|---|---|
| 0139406 | 8/1984 | European Pat. Off. . |
| 0161081 | 11/1985 | European Pat. Off. . |
| 471417 | 2/1929 | Fed. Rep. of Germany . |
| 2056382 | 11/1970 | Fed. Rep. of Germany . |
| 2422289 | 1/1975 | Fed. Rep. of Germany . |
| 2734747 | 8/1977 | Fed. Rep. of Germany . |
| 57-93606 | 6/1982 | Japan . |
| 59-103902 | 6/1984 | Japan . |
| 61-19915 | 2/1985 | Japan . |
| 61-101601 | 5/1986 | Japan . |
| 1488393 | 10/1974 | United Kingdom . |

OTHER PUBLICATIONS

DE 3343203 A1 (Offenlegungsschrift) Germany, 5-1984.

Primary Examiner—Robert E. Garrett
Assistant Examiner—Joseph M. Pitko
Attorney, Agent, or Firm—J. Henry Muetterties; James W. McFarland

[57] ABSTRACT

A rotor-shaft assembly includes a ceramic solid hubbed turbine rotor having an integral stub shaft interference fit within one end of a generally cylindrically shaped sleeve member. The sleeve member defines a hub portion adapted to mate with a piston ring seal and a coaxial bore therethrough. The interference fit, which is defined by the change in the diameter of the bore, schedules the compressive forces acting on the stub shaft. A metal shaft is brazed within the other end of the sleeve member in a torque transmitting relationship.

17 Claims, 2 Drawing Sheets

CERAMIC ROTOR-SHAFT ATTACHMENT

BACKGROUND AND SUMMARY OF THE INVENTION

The present invention relates to rotor-shaft assemblies of the type used in exhaust gas driven turbochargers, and more particularly to the attachment of a ceramic rotor to a metal shaft assembly.

One means of improving the response time of a turbocharger is to reduce the moment of inertia of the rotating parts by constructing the parts of lighter material. Yet the material chosen must be able to withstand the harsh operating environment of the turbocharger. Since the compressor impeller does not see high temperatures in comparison to the turbine wheel, designers began to make the impellers of low weight aluminum alloy which can harmoniously exist in the turbocharger environment.

In the never ending quest for a lighter, economically feasible alternative to the relatively heavy tubine wheel, and one which could survive the high temperatures and gaseous environment of the turbine, the industry's focus turned to using ceramics as a substitute. Once the decision is made to use the lighter, ceramic turbine wheel, there are two alternatives design choices which must be considered; either construct only a ceramic turbine wheel or an integral ceramic shaft and turbine wheel. However, there are problems associated with either solution; the first requires a ceramic to metal joint and the second revolves around economics and durability of a ceramic shaft as compared to a metal shaft and the problems associated with attachment of the compressor impeller thereto.

Thereafter, most efforts have been focused on solving the problem of the ceramic to metal joint as evidenced by U.S. Pat. Nos. 4,063,850; 4,125,344 and 4,424,003 and German Pat. No. 2,734,747. However, none of these efforts have resulted in a reliable joint as evidenced by the fact that there is no commercially available or production model turbine wheel on the market, whether it be in turbochargers or any other turbomachinery. Several of these structures focus on shrink fitting the ceramic stub shaft of the turbine wheel within a metallic sleeve while others have concentrated on the use of an adhesive in order to bond the two materials together.

Utilization of the shrink fit method of attachment gives rise to a further problem: the reduction in the imposition of the high tensile stresses upon the ceramic stub shaft by the sudden discontinuity of contact between the sleeve member and ceramic rotor. This problem leads to the design feature of scheduling the compressive forces exerted by the sleeve onto the shaft by substantially tapering the thickness of the sleeve. This reduction in the thickness of the sleeve results in a reduction in the compressive stresses acting on the rotor and the tensile stresses imposed on the ceramic rotor at the point where contact between the sleeve and rotor ends. It is the tensile stresses which cause the propagation cracks in the ceramic material and can eventually lead to joint failure.

The high temperature, thermal cycling atmosphere of the turbocharger leads to the degradation and failure of the ceramic rotor-metal shaft joint. Failures occur because of several reasons; the metal sleeve radially expands by a greater degree than the ceramic rotor because it has a coefficient of expansion greater than a ceramic thereby loosening the joint; thermal cycling causes "ratcheting", i.e. the easing out of the ceramic stub from the sleeve; and in the case of adhesives, the breakdown of the adhesive in the high temperature environment.

In addition to the above problem of joint integrity, there exists a secondary problem of oil containment if the ceramic rotor or the ceramic to metal joint fails. Heretofore, none of the existing metal to ceramic joints have incorporated any means of preventing oil leakage into the turbine housing in the event of a joint failure.

According to the present invention, a ceramic rotor is attached to a metal shaft to form a rotor-shaft assembly. The rotor-shaft assembly includes a metal sleeve member having a generally coaxial bore formed therethrough. One end of the sleeve extends generally radially outward to form a hub portion which defines an annular surface area generally coaxial to the shaft. The sleeve hub portion includes an annular groove which is sized to generally mate with a piston ring located within the center housing near the turbine end of the turbocharger. The ceramic rotor includes a hub and plurality of blades periodically spaced about the circumference of the hub. The rotor further includes a stub shaft integral with and generally symmetrical about the axis of the hub. The stub shaft is cold press fitted within the end of the sleeve which defines the sleeve hub portion. In addition, the stub shaft has an annular groove therearound. Once the stub has been cold pressed into the sleeve member, a crimped groove, corresponding in location to the groove in the stub, is rolled into the sleeve member. The other end of the sleeve is then interference fitted or brazed onto the shaft in order to place the shaft in torque receiving relationship with the rotor.

It is an object of the present invention to provide a ceramic to metal joint for use within a turbocharger.

It is another object of the present invention to provide a sleeve member for joining a ceramic rotor to a metal shaft and including a portion of a seal between the center housing and the turbine housing.

It is another object of the present invention to provide a means for preventing lubricant from entering the turbine housing in the event of a joint failure or ceramic rotor failure.

It is a further object to provide a method of assemblying a ceramic rotor to a metal shaft.

DETAILED DESCRIPTION OF THE INVENTION

Figure 1:
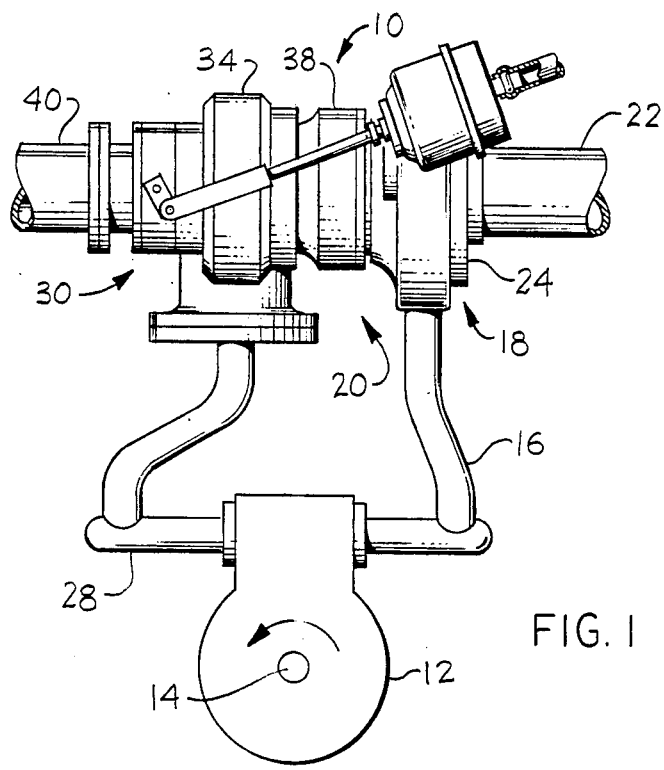
FIG. 1 is an illustration of a turbocharger of a type employing the present invention shown operably coupled to an internal combustion engine.
Figure 2:
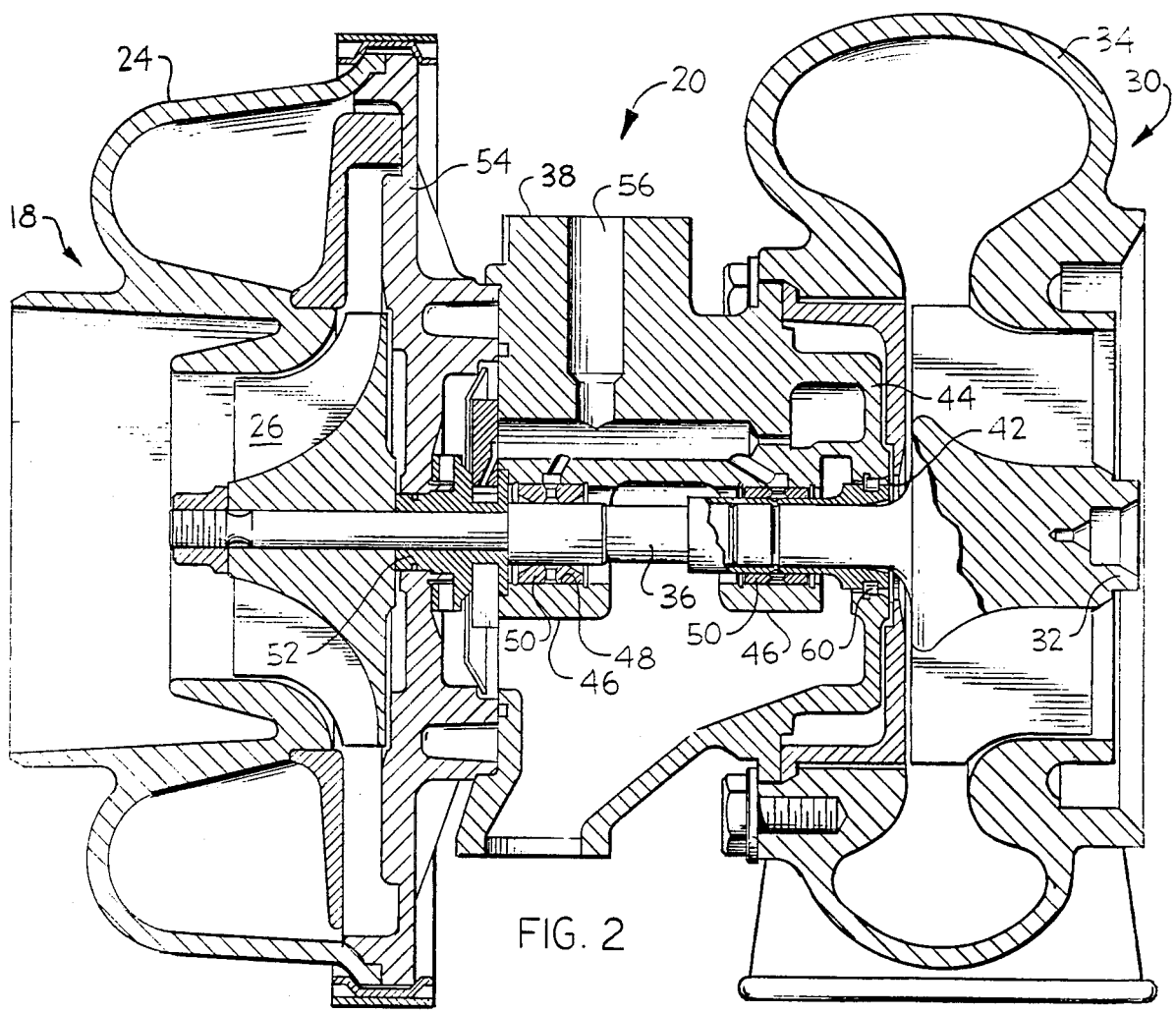
FIG. 2 is a cross-sectional view of a turbocharger of the type employing the preferred embodiment of the present invention.

A turbocharged engine system 10 is shown in FIGS. 1 and 2, and generally comprises a combustion engine 12, such as a gasoline or diesel powered internal combustion engine having a plurality of combustion cylinders (not shown), for rotatably driving an engine crankshaft 14. The engine includes an air intake conduit or manifold 16 through which air is supplied by means of a compressor 18 of the turbocharger 20. In operation the compressor 18 draws in ambient air through an air inlet 22 into a compressor housing 24 and compresses the air with a rotatable compressor impeller 26 to form so called charge air for supply to the engine for combustion purposes.

Exhaust products are discharged from the engine through an exhaust conduit or manifold 28 for supply to a turbine 30 of the turbocharger 20. The high temperature (up to 1000° C.) exhaust gas rotatably drives a turbine wheel 32 within the turbine housing 34 at a relatively high rotational speed (up to 190K RPM) to correspondingly drive the compressor impeller 26 within the compressor housing 24. In this regard, the turbine wheel and compressor impeller are carried for simultaneous rotation on a common shaft 36 supported within a center housing 38. After driving communication with the turbine wheel 32, the exhaust gases are discharged from the turbocharger 20 to an exhaust outlet 40 which may conveniently include pollution or noise abatement equipment as desired.

The turbocharger, as is shown in FIG. 2, comprises the compressor impeller 26 carried on a rotatable shaft 36 within the compressor housing 24. The shaft 36 extends from the impeller 26 through a center housing 38 and an opening 42 formed through the center housing wall 44 for connection to the turbine wheel 32 carried within the turbine housing 34. A compressor back plate 54 separates the center housing 38 and the impeller 26.

The center housing 38 includes a pair of bearing bosses 46 which are axially spaced from one another. The bearing bosses 46 form bearing bores 48 for reception of suitable journal bearings 50 for rotatably receiving and supporting the shaft 36. A thrust bearing assembly 52 is also carried about the shaft for preventing axial excursions of the shaft.

Lubricant such as engine oil or the like is supplied via the center housing 38 to the journal bearings 50 and to the thrust bearing assembly 52. A lubricant inlet port 56 is formed in the center housing 38 and is adapted for connection to a suitable source of lubricant such as filtered engine oil. The port 56 communicates with a network of internal supply passages 58 which are suitably formed in the center housing 38 to direct the lubricant to the appropriate bearings. The lubricant circulated to the bearings is collected in a suitable sump or drain for passage to appropriate filtering, cooling and recirculation equipment, all in a known manner. To provide against leakage of the lubricant from the center housing into the turbine housing a seal or piston ring 60 is received within an annular groove in the surface of the side wall which defines the shaft opening 42.

DESCRIPTION OF THE PREFERRED EMBODIMENT

Figure 3:
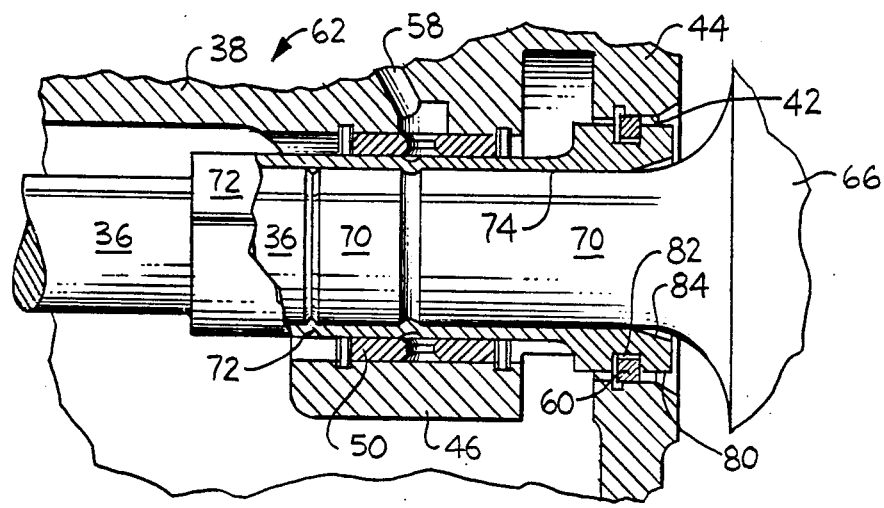
FIG. 3 is an enlarged partial cross-sectional view of a portion of the turbocharger of FIG. 2.
Figure 6:
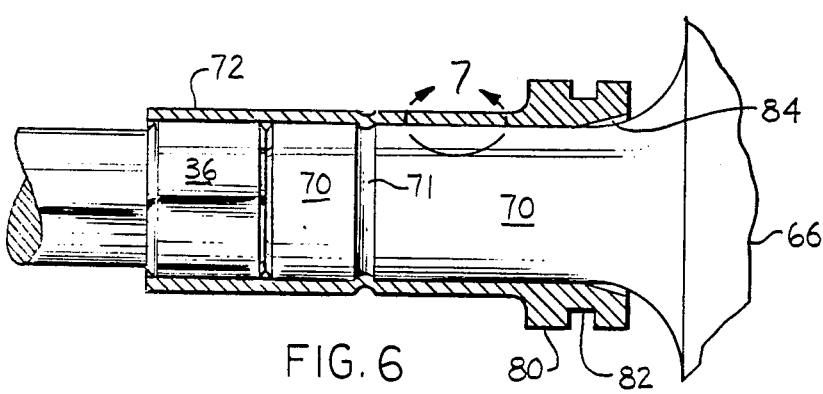
FIG. 6 is a cross-sectional view of the preferred ceramic rotor-metal sleeve joint shown in FIGS. 2 and 3.

The rotor-shaft assembly of the present invention is shown in FIGS. 3 and 6 in its preferred form. The assembly 62 includes a ceramic rotor and a metal sleeve member. The ceramic rotor or ceramic turbine wheel 32 includes a hub 66 and a plurality of blades 68 (see FIG. 2) periodically spaced about the circumference of the hub. The rotor 32 further includes a stub shaft 70 integral with and generally symmetrical about the axis of the hub 66. In addition the stub shaft includes an annular groove 71 therearound having a depth of approximately 0.010 inches and located a desired axial distance from the back face of the rotor blades.

Figure 7:
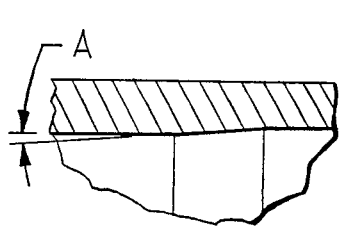
FIG. 7 is an expanded view of a portion of the sleeve in FIGS. 2, 3, 5 and 6.

The metal sleeve member 72 is generally cylindrically shaped and includes a coaxial bore 74 therethrough which may be cast, machined or otherwise formed therein. The bore 74 defines three distinct sections therein (see FIG. 7): a first and a second section, 76 and 77 respectively, of constant diameter and a tapered section 79 therebetween. The first section 76 is sized to be interference fit with the stub shaft of rotor 32. The second section 77 has a diameter greater than that of the diameter of the first section 76 and is also sized such that it is slightly larger than the diameter of the stub shaft 70. The tapered section 79 acts as a transition between the first and second sections and accordingly is tapered radially outward in the direction of rotor 32 (left to right in FIGS. 3 to 6) by a magnitude A.

The taper reduces the clamping forces on the stub shaft by reducing the amount of interference fit. Thus, the tapering of the sleeve member 72 results in a scheduling of the compression forces acting on the stub shaft from some maximum value at the inboard end (compressor end) of the tapered section 79 to a minimum value at the outboard end (turbine end) of this same section. This feature in turn minimizes the tensile stresses exerted upon the stub shaft due to the sudden discontinuities in the degree of the compressive forces, yet permits torque transmission. Furthermore, the tapering assists in piloting the stub shaft into the proper coaxial relationship with the sleeve member during assembly.

By way of example, where the finished outside diameter of the sleeve is approximately 0.360 inches and the diameter of the stub shaft is approximately 0.310 inches, the magnitude of angle A is approximately 1° and the total change in the diameter of cavity 74 is approximately 0.0016 to 0.0020 inches. Since there is only a slight difference (ideally zero clearance) between the diameters of the stub shaft and section 77, the amount of interference fit equals the change in the cavity diameter. Whenever upscaling or downscaling the rotor-shaft assembly of the present invention, the interference fit is adjusted in order to give the same degree of compressive stresses as occurs in the above example. Typically, the angle A can have a magnitude of approximately 0.5 to 2.0°.

At the outboard end of the sleeve 72 is a generally radially outwardly extending hub portion 78 which defines a annular surface area 80 coaxial to the sleeve member 72. The annular surface 80 includes an annular piston ring groove 82 therein which is sized to operably mate with the piston ring 60 located within the center housing 38 of the turbocharger 20. In the assembled state, the hub portion extends radially away from the stub shaft thereby creating an annular gap 84 of increasing diameter in the direction of the rotor blades.

This features ensures that if failure of the joint or breakage of the ceramic rotor occurs the seal between the center housing 38 and the turbine housing 34 remains intact. Furthermore, the method of attaching shaft 36 to sleeve 72 eliminates any potential flow path from the center housing to the turbine housing in those cases where the ceramic rotor stub shaft 70 rachets itself from the sleeve 72. Hence, sealing is a combination of piston ring 60 and the braze joint between the metal shaft 36 and the sleeve 72. Together they prevent oil leakage on failure of the metal-to-ceramic joint or failure of the ceramic. Additionally, seal 60 provides normal function of sealing during normal operation.

Figure 4:
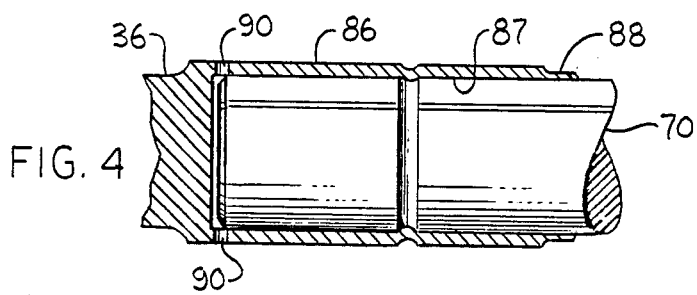
FIG. 4 is a cross-sectional view of another ceramic rotor-metal sleeve joint according to the present invention.

An alternative rotor-shaft assembly is shown in FIG. 4. The assembly of FIG. 4 shows the metal shaft 36 including an enlarged end which defines a sleeve portion 86 having a coaxial bore 87 therein. The outer surface 88 of the outboard end of the enlarged sleeve portion 86 is reduced in thickness in order to schedule the compressive forces acting on the stub shaft 70. This method of scheduling the compressive forces is different from the method used in the preferred embodiment, since it is a reduction in the amount of interference fit rather than a reduction in sleeve material thickness. At least one passage 90 extending radially outward from the bore 87 flow connects the bore to the ambient. Passage 90 acts as a pressure relief during insertion of the stub shaft 70 within the bore 87 to avoid the buildup of compressed air therein. In addition, FIG. 4 shows that one important aspect of the present invention can be used in conjunction with the ceramic to metal sleeves used in the past. As shown, the stub shaft 70 includes the groove 71 therein. After insertion of the stub shaft into the sleeve, a crimp is rolled into the sleeve member as will be explained below.

Figure 5:
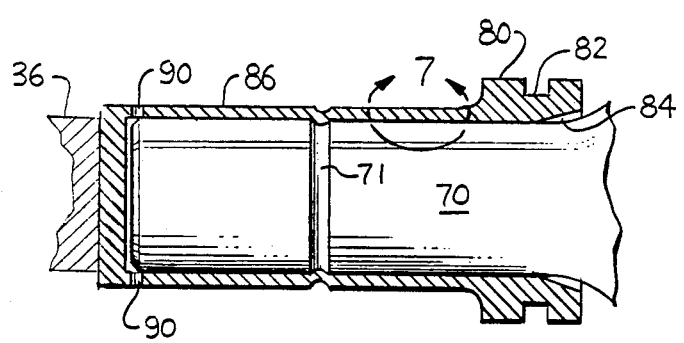
FIG. 5 is a cross-sectional view of still another ceramic rotor-metal sleeve joint according to the present invention.

A second alternative rotor-shaft assembly is shown in FIG. 5 and includes an enlarged shaft end which defines a sleeve portion 86 and includes a central aperture, or cavity or bore 87 which is generally symmetrically distributed about axis of the shaft. As with the preferred embodiment, the surface area defining the bore defines the three distinct sections; 76, 77 and 79, as explained above. The tapered section 79 reduces the interference fit and therefore the compressive forces on the stub shaft which in turn acts to minimize the tensile stresses in the stub 70 as explained above.

Adjacent the inboard end of the bore is at least one radially extending aperture 90 which extends through the sleeve portion and flow connects the bore and the ambient. This aperture acts as a pressure relief during the press fitting of the ceramic stub shaft within the sleeve to prevent the buildup of compressed air within the cavity. In addition, the sleeve member 86 has been roll crimped into the groove 71 on the stub shaft 70 in order to prevent axial movement between the stub shaft and the sleeve.

In all embodiments, the sleeve is located within the bearing 50 nearest the turbine end of the turbocharger. This placement assists in lessening the degree of thermal cycling experienced by the joint. Hence, loosening of the joint by thermal expansion of the sleeve and/or ratcheting is minimized. Additionally, all embodiments have been shown to include the groove 71 in the stub shaft 70 and a rolled crimp 92 in the sleeve member. This feature is optional, and is not necessary for a working ceramic to metal joint.

As is common with the preferred embodiment shown in FIGS. 2, 3 and 6, the alternative embodiment of FIG. 5 includes an improved shaft seal arrangement used in association with a ceramic rotor-metal shaft joint for the turbine end of the turbocharger. More specifically, the improvement comprises an arrangement for preventing lubricant supplied to the bearings 50 from leaking along the shaft and into the turbine housing 34 in the event the ceramic rotor or the rotor-shaft joint fails, as explained above.

FIGS. 4, 5 and 6 also show the progression of the problems encountered and the solutions arrived at during the development of a working ceramic rotor-shaft assembly. In the embodiment of FIG. 4, the sleeve portion is to be constructed of the same material as the shaft, more particularly Incoloy 903, 907 or 909. It is well known in the art that this alloy possesses a low coefficient of thermal expansion and great strength, yet it is costly in comparison to a steel alloy.

Therefore, there was an attempt to reduce the amount of Incoloy by making just the sleeve (FIG. 5) of this alloy. This then lead to the problem of attaching the Incoloy sleeve to a steel shaft as well as the sleeve to a ceramic rotor. Two alternative methods of attachment were arrived at; either have a closed inboard sleeve end as shown in FIG. 5 or open the sleeve end as in FIG. 6. In the case of the closed end of FIG. 5, the end of the shaft would have to be friction or inertia welded to the back side of the sleeve member. This method of attachment led to the problem of how to grip the sleeve without crushing it and/or the stub shaft during the welding process. This problem then led to the development of the present open end design as shown in FIG. 6 and the method of sleeve to shaft attachment as described below.

In addition to the above, the alternate embodiments of FIGS. 4 and 5 impose the additional burden of having to machine a blind hole. Machining a blind hole is more costly than machining an open ended sleeve design as shown in FIG. 6.

According to the present invention the rotor-shaft assembly is constructed by first cold press fitting the ceramic stub shaft 70 within the sleeve hub portion 76. During this operation the stub shaft 70 is piloted into the sleeve bore 74 assisted by the tapered section 79. After insertion of the stub shaft 70, the groove 71 is located within section 76 which is inboard of tapered section 79. Thereafter the outer surface of the sleeve member is roll crimped at 92 in order to force sleeve material into the annular groove 71 of the stub shaft 70. The roll crimping of the sleeve into the groove 71 is accomplished by using a tube cutter having a radiused cutting edge which deforms the metal rather than cutting it. The deformation of sleeve material into the groove 71 acts as a mechanical lock preventing the tendency of the ceramic stub shaft to ratchet itself out of the sleeve due to differential thermal expansion of the two materials during thermal cycling of the joint while operating the turbocharger. It should be noted that while this operation results in sleeve material being forced within the groove 71 in the stub shaft, the crimp in the outer surface of the sleeve has been shown to be exaggerated in the drawings. In reality, this crimp in the outer surface of the sleeve cannot be felt or seen by the naked eye after final machining. Furthermore, the groove 71 is not completely filled with sleeve material nor is it necessary that it is. All that need be accomplished is that enough sleeve material is deformed so as to act as a mechanical detent at each end of groove 71 to prevent axial movement between the sleeve and the stub shaft.

Once the rotor 32 and sleeve member 72 are attached, the inboard end of the sleeve is brazed or interference fitted onto the shaft 36 in the case of the sleeve member 72 as shown in preferred embodiment. Brazing is accomplished by depositing braze material into the sleeve base adjacent the end of the stub shaft. The end of shaft 36 is then inserted into the sleeve until it abuts the braze material. Thereafter, heat is applied using induction coils until the braze material wicks out of the sleeve, signalling that the gap between the inner surface of the sleeve and the metal shaft has been completely filled.

Cold press fitting of the stub shaft within the sleeve is an improvement in the art, since it allows the sleeve to retain its mechanical properties. On the other hand, the shrink fitted method of attachment between the metal sleeve and ceramic rotor weakens the sleeve material in the sense that the material has been annealed or tempered by the heat shrinking process and therefore loosens more easily when subjected to the thermal cycling atmosphere of a turbocharger.

Various modifications to the depicted and described apparatus will be apparent to those skilled in the art. Accordingly, the foregoing detailed description of the preferred embodiment of the invention should be considered exemplary in nature, and not as limiting to the scope and spirit of the invention as set forth in the appended claims.

Having described the invention with sufficient clarity that those skilled in the art may practice it, I claim:

1. A rotor shaft assembly comprising:
   a metal sleeve member having a cavity therein generally symmetrically distributed about the sleeve axis, said sleeve cavity includes a first and a second section of constant diameters and a tapered section therebetween, said first section being inboard of said second section;
   a ceramic rotor having a stub shaft symmetrically distributed about the rotor axis, said stub shaft sized to a press fit within said sleeve cavity and including an annular groove therearound;
   a crimp in said sleeve member corresponding to said annular groove in said stub shaft; and
   a shaft coaxially affixed to said sleeve member in torque receiving relationship.

2. The rotor-shaft assembly of claim 1 wherein said first section has a diameter smaller than the second section.

3. The rotor-shaft assembly of claim 1 wherein said tapered section is tapered by an amount of less than approximately 0.5° to 2.0°.

4. The rotor-shaft assembly of claim 1 wherein said sleeve includes an open and closed end and having at least one relief bore radially through said sleeve member adjacent said closed end.

5. The rotor-shaft assembly of claim 4 wherein said shaft is attached to said closed end of said sleeve member in torque receiving relationship.

6. The rotor-shaft assembly of claim 1 wherein said sleeve cavity extends axially through said sleeve member.

7. The rotor-shaft assembly of claim 6 wherein said sleeve member is brazed to said shaft.

8. A method of joining a ceramic rotor having a stub shaft to a metal shaft comprising the steps of:
   forming a constant diameter coaxial bore in a generally cylindrically shaped sleeve member;
   coaxially enlarging said bore at one end of said sleeve member;
   tapering said sleeve member between said bore and said enlarged bore;
   cold press fitting the stub shaft having a diameter greater than said bore diameter and equal to or less than said enlarged bore diameter into said sleeve member; and
   securing said shaft to said sleeve member opposite said rotor.

9. The method according to claim 8 further comprising the step of machining an annular groove about the stub shaft and cold roll crimping the sleeve member into said groove after the stub shaft has been cold fitted into the sleeve bore.

10. The method according to claim 9 wherein said shaft is friction welded to said sleeve member.

11. The method according to claim 8 wherein the step of forming a bore in said sleeve includes forming a bore through the entire length of said sleeve member.

12. The method according to claim 11 wherein the step of securing the shaft to said sleeve includes brazing the shaft within the sleeve bore at the end opposite of said rotor.

13. A rotor-shaft assembly comprising:
   a ceramic rotor having a stub shaft symmetrically distributed about the rotor axis;
   a metal sleeve member having a coaxial bore therethrough which bore defines a first and a second bore section of constant diameter and a tapered intermediate section therebetween, said first section having a diameter less than the second section and the stub shaft diameter, and said second section diameter slightly larger than the stub shaft diameter;
   a shaft coaxially affixed to said sleeve member in torque receiving relationship.

14. The rotor-shaft assembly of claim 13 wherein the first section is located inboard of said second section.

15. The rotor-shaft assembly of claim 13 wherein the intermediate section is tapered by an amount of approximately 0.5° to 2.0°.

16. A rotor-shaft assembly comprising:
   a metallic shaft having a coaxial bore in one end thereof, said bore defining a first section having a constant first diameter, a second section, having a constant second diameter, said second diameter being greater than said first diameter and a third section located between said first and second sections having a gradually increasing diameter between said first and second sections;
   a ceramic rotor press fit within said bore, said rotor having a stub shaft symmetrically distributed about the rotor axis, said stub shaft having a diameter less than or equal to the diameter of said second section and greater than the diameter of said first second.

17. The rotor-shaft assembly of claim 16 further including an annular groove around said stub shaft; and
   a crimp in said shaft member corresponding to said annular groove in said stub shaft.

* * * * *